A. J. HOLMES.
SHAFT ALINER.
APPLICATION FILED APR. 11, 1908.
922,143.
Patented May 18, 1909.
2 SHEETS—SHEET 2.
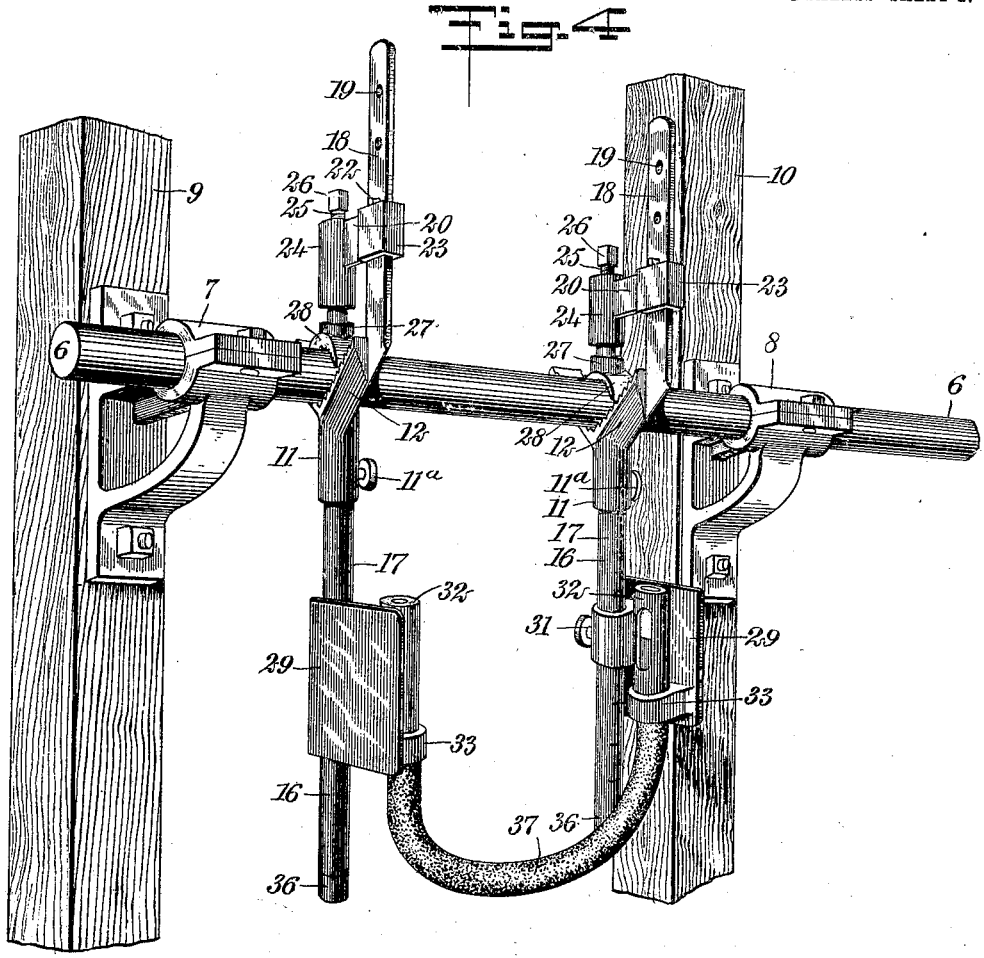
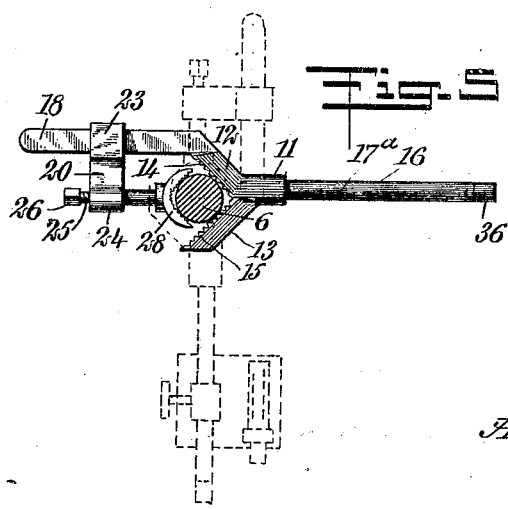
WITNESSES
F. D. Sweet.
W. Harrison.
INVENTOR
Adam J. Holmes
BY
ATTORNEYS

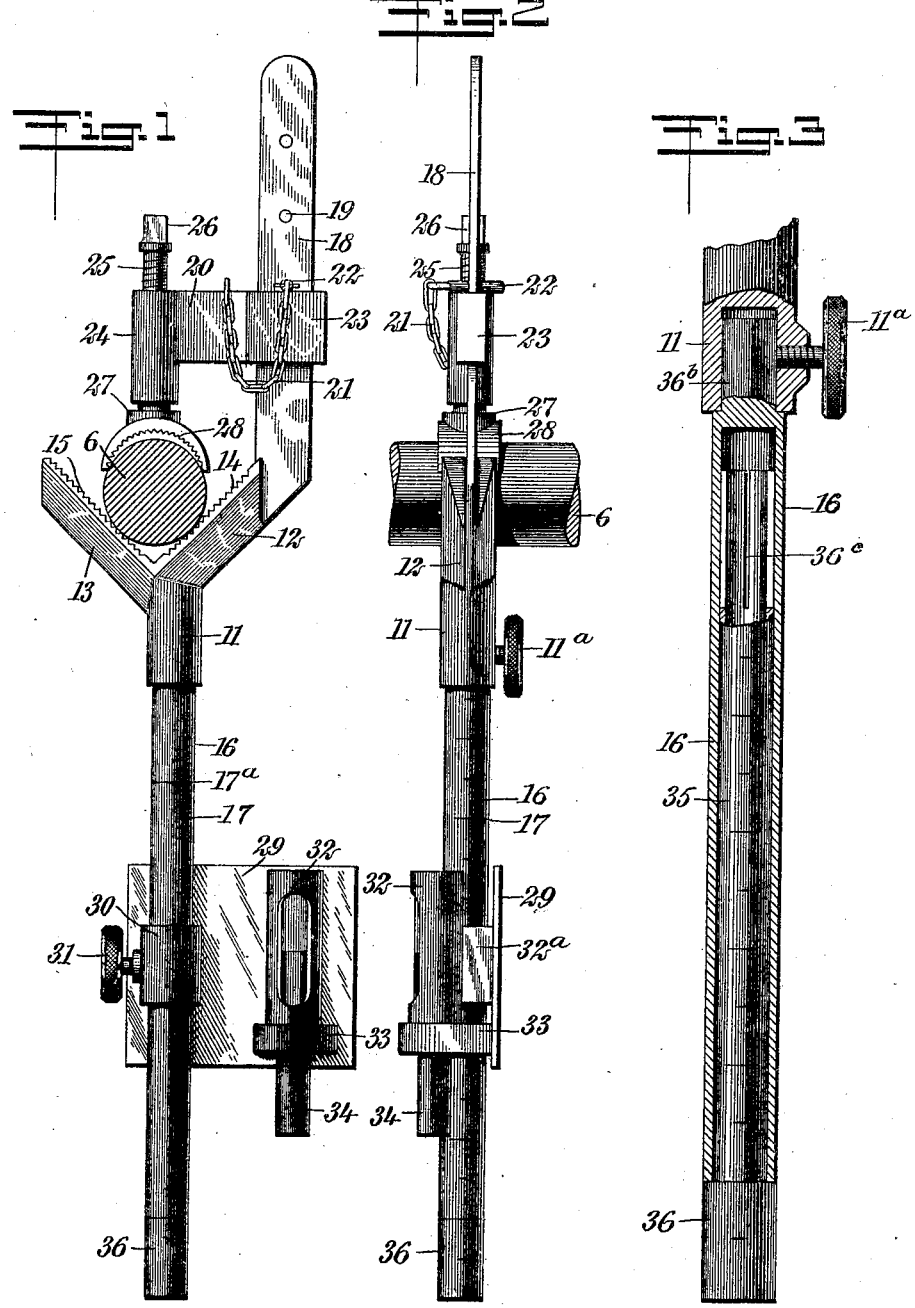

UNITED STATES PATENT OFFICE.

ADAM J. HOLMES, OF GOUVERNEUR, NEW YORK.

SHAFT-ALINER.

No. 922,143.   Specification of Letters Patent.   Patented May 18, 1909.

Application filed April 11, 1908. Serial No. 426,527.

*To all whom it may concern:*

Be it known that I, ADAM J. HOLMES, a citizen of the United States, and a resident of Gouverneur, in the county of St. Lawrence and State of New York, have invented a new and Improved Shaft-Aliner, of which the following is a full, clear, and exact description.

My invention relates to shaft aliners, my more particular purpose being to provide a device suitable for ascertaining the so-called "vertical alinement" and also the so-called "horizontal alinement" of a shaft.

My invention further contemplates an aliner provided with jaws for gripping a shaft in such manner that, regardless of the diameter of the shaft, the center of the shaft is always in alinement with a certain portion of the alinement apparatus.

My invention further provides for compactness in the mechanism in order that the latter may be reduced into a small compass and thereby handled easily; to this end my invention contemplates making certain parts of the aliner telescopic in character.

Reference is to be had to the accompanying drawings forming a part of this specification, in which similar characters of reference indicate corresponding parts in all the figures.

Figure 1 is a central vertical section through a shaft to which my improved aliner is applied, this view showing how the center of the shaft always coincides with a predetermined surface of one of the tubes forming a part of the aliner, this view further showing how the shaft is made self-centering in regard to the aliner; Fig. 2 is a front elevation showing the same mechanism as that appearing in Fig. 1; Fig. 3 is an enlarged fragmentary section through a portion of the telescopic tubing forming a part of the aliner and adapted to be extended if desired; Fig. 4 is a perspective showing the aliner complete and mounted upon a shaft for the purpose of securing the so-called "vertical measurements" of the shaft, or in other words, ascertaining whether the shaft is in proper alinement relatively to an imaginary horizontal plane; and Fig. 5 is a view somewhat similar to Fig. 1, but showing the aliner as used for locating a shaft relatively to a predetermined vertical plane.

The shaft to be alined is shown at 6 and is supported upon bearings 7, 8, the latter being mounted upon woodwork 9, 10. A sleeve 11 is provided with jaws 12, 13 having teeth 14, 15. The sleeve 11 is secured to a tube 16 provided with graduations 17 and with a surface $17^a$, the parts being so proportioned that this surface must always be in alinement with the shaft when the latter is being alined. The sleeve 11 is fitted with a set screw $11^a$ for the purpose of securing the tube 16 as hereinafter described.

Formed integrally with the jaw 12 is an arm 18 provided with holes 19 spaced equidistant therein. A bracket 20 is provided with a sleeve 23 integral therewith, this sleeve encircling the arm 18 and being adapted to slide thereupon. A chain 21 is connected with the bracket 20 and also with a pin 22, this pin being of proper size to fit into the holes 19. The bracket 20 is further provided with a sleeve 24 which is fitted with a bolt 25, this bolt being provided with an angular head 26 whereby it may be turned relatively to the sleeve. A head 27 is movable relatively to the sleeve 24 by aid of the bolt 25. Mounted upon the head 27 is a jaw 28 integral with it and adapted, like the jaws 12, 13, to engage the shaft 6.

A plate 29 is provided with a sleeve 30 for encircling the tube 16. This sleeve is further provided with a set screw 31 revoluble by hand for the purpose of securing the sleeve 30, and consequently the plate 29, rigidly in position relatively to the tube 16. A gaging sight 32 is mounted upon the plate 29 by aid of a rest 33 and is provided with a tubular extension 34.

Slidably mounted within the tube 16 is a smaller tube 35 provided with an enlarged portion 36, the diameter of the latter being the same as the diameter of the tube 16. The tube 16 is provided with a reduced portion $36^b$ (see Fig. 3) which is engaged by the set screw $11^a$. By turning this set screw, therefore, the tube 16, carrying with it a tube 35, may be detached. The tube 35 moves telescopically within the tube 16 and may be drawn out therefrom to any desired extent. To aid in this purpose, one end of the tube 16 is provided with slots $36^c$ in order to give it some resilience and to enable it to press gently against the inner surface of the tube 16.

To facilitate the mounting of the gaging sight 32, it is fitted upon a block 32ª carried by the plate 29. A tube 37 of rubber, or other resilient material, is adapted to be fitted upon the tubular extension 34.

The complete aliner consists practically of two of the devices above described and shown in Fig. 1, these two devices being connected together by the tube 37, as will be understood from Fig. 4.

A level (not shown) which may be either a spirit level or a plumb level, as desired, is used in connection with the plate 29 for securing certain measurements relatively to the alinement of the shaft, as hereinafter described.

The operation of my device is as follows: In order to fit the aliner for shafts of different diameter, all that is necessary is to withdraw the pin 22, move the bracket 20 upward or downward, as the case may be, and insert the pin 22 through another hole than that previously occupied by it. This will be understood from Figs. 1 and 2. This adjustment being made, a finer adjustment is next made by turning the bolt 25, by aid of its angular head 26, so as to force the jaw 28 and the jaws 12, 13 against different portions of the shaft 6. In doing this, the center of the shaft (see Fig. 1) is brought into precise alinement with the left-hand portion 17ª of the tube 16, as seen in this figure. The two members of the aliner being exactly alike, I designate them, for convenience, as the right member and the left member, the distinction between them being based merely upon convenience. Having connected both members to the shaft and having brought the tubes 16 into vertical position, as indicated in Fig. 4 (using a plumb line for this purpose if desired), the operator pours water into the tube 37 and gaging sight 32, so as to bring the upper level of the water into view in the two gaging sights 32. The operator, by noting differences in the level of the water, and by measuring, or otherwise knowing, the distance between the right and left members of the aliner, can readily ascertain whether or not the shaft be level, and, if not, how far from a true level it deviates. These measurements the operator can repeat from one end of the shaft to the other, no matter how long the shaft may be. Suppose, now, that the operator wishes to ascertain whether the shaft 6, at any point along its length, deviates from a plane passing vertically through its axial center. He takes off the plates 29 and parts carried by these plates. He next raises the tubes 16 into the position indicated in Fig. 5, and next ties a cord around both of the tubes 16, the engagement of the cord being at a predetermined distance from the center of the shaft. To aid in this purpose, I provide the tubes 16 with the graduations 17, as indicated in Figs. 1, 2 and 5. The cord being stretched from the tube 16 of one member of the aliner to the tube 16 of the other member thereof, and both ends of the cord being equidistant from the center of the shaft, the operator places a level (preferably a small spirit level, not shown,) against the tube 16 and moves this tube until it is exactly level. He can now take measurements from various points along the cord to the shaft and in this manner can determine whether or not the shaft is to any extent out of alinement relatively to an imaginary plane passing vertically through its axis.

It will be noted that the two members of the aliner are, to some extent, independent of each other. It is true that one member can not be used to any great advantage without the other member, but it is also true that having both members substantially alike greatly increases the scope and utility of the aliner; for instance, in the replacement of broken parts and the interchanging of the aliner members.

While in use the tube 35 may be withdrawn to any desired extent. This tube being provided with an enlarged portion 36 of the same diameter as the tube 16, virtually enables the tube 16 to be lengthened. When the device is ready for packing, however, the tube 35 may be readily telescoped within the tube 16 and if need be, both tubes removed from the brackets 11 by loosening the screws 11ª.

Having thus described my invention, I claim as new and desire to secure by Letters Patent:

1. A shaft aliner comprising a member provided with a jaw and with an arm integral with said jaw and forming a continuation of the same, said arm being provided with holes, a bracket slidably mounted upon said arm, a pin for extending into said holes and thereby holding said bracket, and a jaw mounted upon said bracket and mating said first-mentioned jaw for the purpose of engaging the shaft.

2. In a shaft aliner, the combination of a longitudinal member provided with a jaw, and further provided with an arm integral with said jaw and constituting an extension thereof, said arm being parallel with said longitudinal member, a second jaw mating said first-mentioned jaw for the purpose of gripping a shaft, a bracket mounted upon said arm for the purpose of supporting said second-mentioned jaw, and means for adjusting said second-mentioned jaw relatively to said bracket.

3. In a shaft aliner, the combination of a longitudinal member provided with a jaw and further provided with an arm integral with said jaw and forming a continuation thereof, said arm being parallel with said longitudinal member, a second jaw mating said first-mentioned jaw for the purpose of gripping a shaft, a bracket mounted upon said arm and movable relatively thereto, and means for securing said bracket in different positions upon said arm.

In testimony whereof I have signed my name to this specification in the presence of two subscribing witnesses.

ADAM J. HOLMES.

Witnesses:
WILLIAM PALMER,
ROY W. SMITH.